US012607646B2

(12) United States Patent
Becker et al.

(10) Patent No.: US 12,607,646 B2
(45) Date of Patent: Apr. 21, 2026

(54) PULSE WHEEL FOR MEASURING THE REVOLUTION OF A WHEEL OF A VEHICLE AND SYSTEM FOR DETERMINING THE SPEED OF A VEHICLE

(71) Applicant: K.W.H. Ciclosport Vertriebs GmbH, Krailling (DE)

(72) Inventors: Christian Becker, Krailling (DE); Georg Jahnen, Krailling (DE)

(73) Assignee: K.W.H. Ciclosport Vertriebs GmbH, Gräfelfing (DE)

( * ) Notice: Subject to any disclaimer, the term of this patent is extended or adjusted under 35 U.S.C. 154(b) by 199 days.

(21) Appl. No.: 18/731,833

(22) Filed: Jun. 3, 2024

(65) Prior Publication Data

US 2024/0410912 A1     Dec. 12, 2024

(30) Foreign Application Priority Data

Jun. 6, 2023    (EP) ...................................... 23177580
Apr. 16, 2024   (EP) ...................................... 24170467

(51) Int. Cl.
G01P 3/46         (2006.01)
G01P 3/48         (2006.01)
G01P 3/49         (2006.01)

(52) U.S. Cl.
CPC ................ G01P 3/465 (2013.01); G01P 3/49 (2013.01)

(58) Field of Classification Search
CPC .... G01P 3/46; G01P 3/48; G01P 3/488; G01P 3/49
See application file for complete search history.

(56) References Cited

U.S. PATENT DOCUMENTS

| | | | |
|---|---|---|---|
| 3,317,829 | A | 5/1967 | Friedrich et al. |
| 3,716,787 | A | 2/1973 | Hammond |
| 4,947,116 | A * | 8/1990 | Welcome .................. G01P 3/49 |
| | | | 324/161 |
| 8,330,451 | B2 * | 12/2012 | Schunk ................ G01D 5/2073 |
| | | | 324/173 |

FOREIGN PATENT DOCUMENTS

| | | |
|---|---|---|
| DE | 202016000534 U1 | 5/2016 |
| EP | 3178733 A1 | 6/2017 |
| FR | 2583514 A1 | 12/1986 |

* cited by examiner

*Primary Examiner* — Neel D Shah
(74) *Attorney, Agent, or Firm* — HARNESS, DICKEY & PIERCE, P.L.C.

(57)          ABSTRACT

Pulse wheel and system for determining the speed of a vehicle based on a revolution measurement of a wheel of the vehicle. The wheel has a wheel axle which is fixed to a frame of the vehicle and a hub which rotates thereon. A brake disc is connected to the hub. A pulse wheel is attached in a rotationally fixed manner in relation to the hub in the installed state. A measuring device determines the revolutions of the pulse wheel. The pulse wheel has a first material which does not influence the measuring device, and a second material, preferably an electrically conductive material, which influences the measuring device. The measuring device is an oscillator which excites an oscillating circuit, the amplitude of which is damped by the movement of the second material in the alternating electromagnetic field of a coil of the oscillator. An evaluation circuit evaluates the change in the voltage of the oscillating circuit and determines the revolutions of the pulse wheel.

16 Claims, 7 Drawing Sheets

PULSE WHEEL FOR MEASURING THE REVOLUTION OF A WHEEL OF A VEHICLE AND SYSTEM FOR DETERMINING THE SPEED OF A VEHICLE

CROSS-REFERENCE TO RELATED APPLICATIONS

This application claims priority to and the benefit of European Patent Nos. EP 23 177 580.0, filed Jun. 6, 2023 and EP 24 170 467.5, filed Apr. 16, 2024. The disclosure of each of the above applications are incorporated herein by reference.

FIELD

The invention relates to a pulse wheel for measuring the revolution of a wheel of a vehicle and a system for determining the speed of a vehicle, in particular an optionally electric motor-driven vehicle such as a bicycle, scooter, wheelchair, scooter or the like, on the basis of a revolution or rotation measurement of a wheel of the vehicle.

BACKGROUND

The statements in this section merely provide background information related to the present disclosure and may not constitute prior art.

Such systems are known and comprise a pulse wheel that is coupled to a wheel of the vehicle and co-rotates with it, as well as a speed sensor (measuring device) that is assigned to the pulse wheel and detects its rotation. The wheel comprises a wheel axle that can be fixed to the vehicle frame and a hub that can rotate on it with wheel spokes or a disc fixed to it and often a brake disc firmly connected to the hub. When fitted, the pulse wheel is then usually mounted between the brake disc and the vehicle frame so that it cannot rotate relative to the hub.

In the most common methods for determining the speed of a vehicle, especially a bicycle or similar, a small magnet is attached to the spokes of the wheel. The magnet is usually located in proximity of the hub and is positioned so that it moves past a sensor each time the wheel rotates. The sensor is mounted on the frame or fork of the vehicle and detects the passing of the magnet.

The speed sensor comprises a stationary magnetic sensor, in particular a Hall sensor or Hall effect sensor, which detects the magnetic field or magnetic flux density when the magnet moves past it. Each time the magnet passes the sensor, an electrical signal is generated. This signal is then sent to an evaluation circuit in a bike computer or in the speed sensor itself.

The bike computer or speed sensor counts the number of signals that the sensor generates in a certain time interval. By combining the number of signals with the known circumference of the wheel, the distance traveled and, in relation to the time, the speed can be calculated. Some bike computers display the speed continuously, while others update the speed at regular intervals.

It is important that the sensor is correctly aligned and that the distance between the magnet and the sensor is appropriate, in order to achieve reliable results. A too great distance or an incorrect alignment can lead to inaccurate measurements.

Particularly in the field of electric bicycles, there is now a move away from using just a single magnet to detect one revolution of the wheel, as higher accuracy and tamper-proof speed detection is required due to legal requirements for motor assistance. For this reason, pulse wheels are used which contain several magnets and are configured, together with corresponding sensors, in such a way that they generate several pulses per revolution of the wheel. However, magnets are relatively expensive, especially in large quantities.

In addition, systems with a small number of magnets have the problem, especially when used with electric bicycles, that a very slow pushing speed can only be detected inaccurately or with a delay for short pushing distances, for example when maneuvering the bicycle by hand, so that the pushing assistance of the electric motor that depends on it, cannot be reliably activated.

It should also be taken into account that just road bikes and racing bikes in particular only have a very small mounting space and a small mounting width and height available to mount the pulse wheel and the associated evaluation or measuring device. It should also be noted that it should often be possible to remove the wheel itself using a quick-release fastener.

U.S. Pat. No. 3,317,829 A discloses an arrangement for converting a rotational speed into an electrical voltage or an electrical current, which has a pulse wheel which is rotatable and which faces a stationary Hall sensor with its circumference. The pulse wheel is made of a non-magnetizable material such as aluminum, brass or an insulating material and has a number of, for example, 100 small permanent magnets or elements made of magnetizable material, which are regularly distributed around the circumference of the wheel and embedded in it. The rotating pulse wheel generates a voltage in the Hall sensor with a frequency proportional to the rotational speed and number of magnets.

U.S. Pat. No. 3,716,787 A discloses a motion detection system using a pulse tachometer comprising a wheel of non-magnetic, non-conductive material, such as fibers or Teflon, with a plurality of equally spaced, magnetically separated pins in the periphery which move into proximity with a pick-up coil of a tuned circuit to change the impedance therein. The change in impedance causes a phase shift of the circuit which is compared to a predetermined reference phase of voltage and current in the circuit to provide an indication of movement of the wheel and a measurement of the speed of the movement in a measured time interval.

FR 2 583 514 A1 discloses an arrangement for measuring rotational movements comprising a movable element connected to a rotatable part and a fixed Hall sensor. The Hall sensor provides an electrical signal that depends on a magnetic field generated or disturbed by magnetized or magnetic zones interposed between non-magnetic or very weakly magnetic areas located opposite the sensor on a surface of the movable element. The magnetized or magnetic zones are produced by injecting a plastic material loaded with magnetizable particles into recesses or notches previously made in the movable element.

EP 3 178 733 A1 discloses a wheel unit for a bicycle comprising a hub and a rim which is arranged movable, so as to be rotatable about an axis of rotation, wherein the hub and the rim are connected to one another by spokes. A brake disc and a sensor rim, which comprises a sensing area with a rotationally symmetrical toothed structure that varies periodically in the direction of rotation and has a magnetic field-influencing effect that can be detected by a Hall sensor facing the sensing area, are arranged on the hub in such a way that the sensing area is positioned between the brake disc and the spokes. The sensor ring is attached to the hub with 6 bolts via retaining webs similar to the support webs of a brake disc. The rotational speed is determined from the temporal change in the effect of the magnetic field.

SUMMARY

This section provides a general summary of the disclosure and is not a comprehensive disclosure of its full scope or all of its features.

The object underlying the invention is therefore providing a pulse wheel for measuring a rotation speed of a vehicle wheel and a system for determining the speed of a vehicle, in particular an electric motor-driven vehicle such as a bicycle, scooter, wheelchair, scooter or the like, which are cost-effective and can also accurately detect low speeds. In addition, the pulse wheel of the system should be able to be mounted in a space-saving manner and enable space-saving installation of a measuring device. Another aspect is the possibility of integrating the pulse wheel or system into existing vehicle concepts without major structural modifications.

According to the invention, this object is achieved by a pulse wheel for measuring the revolution of a wheel of a vehicle having the features of claim 1 and a system for determining the speed of a vehicle having the features of claim 12.

Further advantageous embodiments are specified in the dependent claims, the description and in the figures and their description.

In one aspect the present invention relates to a pulse wheel for a revolution measurement of a wheel of a vehicle, wherein the wheel comprises a wheel axle which can be fixed to a frame of the vehicle and a hub which can be rotated thereon and preferably a brake disc fixedly connected to the hub, wherein the pulse wheel is configured to be mounted, in the installed state, between the brake disc and the frame in rotational fixed manner with respect to the hub, wherein the pulse wheel comprises two different materials, wherein a first material is configured to exert no influence on a measuring device for determining the revolutions, and wherein a second material is configured to exert an influence on the measuring device, and wherein the pulse wheel is configured in the form of a wheel or disc, with a width, a radius and a circumference, wherein areas with the first material and areas with the second material are arranged alternately with respect to one another on the circumference.

In another aspect the present invention also relates to a system for determining the speed of a vehicle on the basis of a revolution measurement of a wheel of the vehicle, wherein the wheel comprises a wheel axle which can be fixed to a frame of the vehicle and a hub which can be rotated thereon and preferably a brake disc which is firmly connected to the hub. The system comprises a pulse wheel according to the invention, which is attached or to be attached in a rotational fixed manner with respect to the hub, and a measuring device assigned to the pulse wheel in the installed state for determining the revolutions of the pulse wheel. The pulse wheel comprises the two different materials, wherein the first material is configured to exert no influence on the measuring device and wherein the second material is an electrically conductive material to exert influence on the measuring device. The measuring device comprises an oscillator which excites an oscillating circuit comprising an inductor and a capacitor whose oscillating circuit amplitude is damped by the movement of the second material into the alternating electromagnetic field of the inductor, and an evaluation circuit configured to evaluate the change in the oscillation amplitude of the voltage of the oscillating circuit produced thereby and to determine the revolutions of the pulse wheel.

In this context, circumference can also be understood as the radially outward-facing circumferential surface, which is defined by the geometric circumference and the width of the pulse wheel.

The pulse wheel or system according to the invention enables the speed of the wheel of the vehicle to be determined indirectly by detecting the revolutions of the pulse wheel co-rotating with it—in the installed state—with high resolution, even at low speeds and with low implementation costs.

The provision of two different materials provides the advantage that pulses can be specifically generated in the measuring device or measured by it. This makes it possible to determine the number of signal changes during one revolution of the wheel and thus of the pulse wheel. This influences the resolution of the measuring device.

It is advantageous if an electrically non-conductive material is used as the first material, which causes no or no significant signal changes in the measuring device used, which comprises a resonant circuit. In particular, it is advantageous if an electrically non-conductive plastic material is used. In principle, however, other materials are also suitable that have no influence on conventional measuring devices based on magnetic, electromagnetic or electric field technologies.

An electrically conductive material, which can also be ferromagnetic, is preferably used as the second material. It can be a metallic material or a conductive plastic, for example. This is particularly suitable as the measuring device works in conjunction with the oscillating circuit, which is influenced by the metallic material. However, if, for example, a Hall sensor is used with the pulse wheel, the second material can also be a magnetic material that is used to generate pulses.

The use of the low-cost electrically conductive material in conjunction with the measuring device according to the invention, which can also be manufactured at low cost and is based on a resonant circuit whose damping is evaluated by the influence of this material alternating with the first material, makes it possible to dispense with expensive permanent magnets in the pulse wheel, which is particularly relevant from an economic point of view if the number of areas with the second material is increased to increase the resolution.

In accordance with the invention, it was also recognized that it is advantageous, particularly with regard to space-saving installation of the measuring device, to carry out an evaluation, signal determination or generation not via the radius or the side surface of the pulse wheel, but via the radially outward-facing circumferential area. As can be seen in particular in FIG. 1, this makes it possible to mount the measuring device, which is not also aligned along the axis of the wheel. With the pulse wheel according to the invention, the measuring device can be positioned radially to the pulse wheel, i.e. in the same plane. This significantly reduces the space required in the axial direction of the hub.

In addition, the torsion-proof coupling of the pulse wheel to the hub reduces the risk that unintentional contact with the spoke magnet used in the prior art, for example, which is not mechanically attached to the spokes of a wheel in a very stable manner, could cause it to leave the detection range of the measuring device and the speed measurement to be interrupted. The use of the pulse wheel also allows a secure, non-rotating attachment to the hub, independent of the specific spoke shape and alignment, for example via the standardized fastenings of the brake disc.

The provision of two different and not very expensive materials also offers the advantage that a higher number of pulses can be generated in the measuring device or measured by it. This allows the number of signal changes during one revolution of the wheel and thus of the pulse wheel to be determined. This improves the resolution of the measuring device.

It has proven to be advantageous that the areas with the first material and the areas with the second material on the circumference of the pulse wheel are each configured to be substantially the same size. However, this is generally not necessary. The exact design depends, in particular on the selected detection principle of the measuring device and its detection sensitivity.

Particularly good detection results have been achieved when the areas with the first material and the areas with the second material on the circumference of the pulse wheel are substantially evenly or uniformly distributed. In other words, there can be a regular change between the two materials. However, it is also conceivable to deliberately provide the materials unevenly or ununiformly on the circumference of the pulse wheel, in order to determine additional information about the rotation, in particular the direction of rotation. For example, a repeating signal pattern can be imprinted. This can be advantageous, in particular, to detect manipulations, as the manipulated signals received in this way may then possibly deviate from the original distinct signals. However, when using more than one detection device it is also possible to detect the direction of rotation For a highly accurate resolution, it has proven to be particularly practicable that at least 20 areas with the first material and 20 areas with the second material should be provided on the circumference of the pulse wheel. This enables a very high resolution compared to a conventional sensor. The number of areas is specified by the application. Experience has shown that 20 areas of each are sufficient to carry out a measurement for an e-bike or pedelec pushing aid, for example. To control certain driving parameters, however, there should be at least 40 areas of each type.

In a preferred embodiment, the pulse wheel, in particular, a radially inner region inside the outer circumference which supports the detection area and serves to fasten the hub (main body of the pulse wheel) consists mainly of the first material, which has no influence on the measuring or detection device. This is a departure from conventional pulse wheels, which are usually made of a material with air gaps. It is emphasized that the second material preferably cannot be air, but a solid medium, preferably an electrically-conductive medium. By providing the main body of the pulse wheel made of the first material, which does not generate any signals in the detection device, a clear and distinct signal can be generated by the targeted application of the second material, which in turn significantly improves the detection properties.

The main body of the pulse wheel can be manufactured by using an injection molding process, for example. In principle, however, other manufacturing processes that are suitable for plastic, for example, are also possible. Areas, in particular recesses, for the second material can be provided on the circumference of the main body of the pulse wheel. The second material can then be inserted, in particular, glued, into these recesses. However, a form-fitting press fit or similar is also possible.

In general, the pulse wheel can be designed in the form of a disc, in particular a wider disc. Similarly, it is also possible to design the pulse wheel itself in a wheel-like manner, with reinforcement in the circumferential area and spoke-like extensions in the direction of the center of the pulse wheel. In principle, the weight of the pulse wheel should be as low as possible, in order to have no or negligible influence on the rotation of the wheel.

In principle, the pulse wheel can be any size. However, it is advantageous if the pulse wheel has a diameter that is at least twice the size of the diameter of the hub. As a maximum size, it is preferable if the diameter of the pulse wheel is smaller, in particular twice as small as the diameter of the brake disc also provided on the hub. The diameter of the pulse wheel can thus be between 20 mm and 70 mm, for example.

Such a sizing has proven to be an efficient average value, as the larger the pulse wheel, the better the resolution of the signals, but the more space is required. In particular, making the pulse wheel smaller than the brake disc enables that the pulse wheel and the measuring or detection device matched to it, do not compete for space with the brake disc and the brake caliper, so that there are sufficient degrees of freedom to mount the pulse wheel.

In principle, the pulse wheel can be attached directly or indirectly rotational fixed to the hub as required. A simple attachment option is when the pulse wheel is configured to be attached to the brake disc or on an attachment of the brake disc (a locking or a lock ring). Standard brake discs have mounting options as standard. These can be used for this purpose. These are, for example, an internal Centerlock, external Centerlock or 6-bolt mounting.

Preferably, the pulse wheel is therefore configured to be indirectly rotational fixed to the hub by positive engagement with a toothing of an internal Centerlock fastening or an external Centerlock fastening of a locking or lock ring of the brake disc, so that the pulse wheel is mounted between the brake disc and the bicycle frame in a rotational fixed manner with respect to the hub, in the installed state.

In a variant not shown, the pulse wheel can be configured to serve itself as a locking or lock ring of the brake disc and thus replace the usual locking or lock ring. To this end, the pulse wheel is preferably configured with an internal Centerlock fastening or an external Centerlock fastening (toothing) as well as the thread matching the hub, to which the usual tool of the locking ring can be attached, in order to screw the pulse wheel into the corresponding mating thread on the hub.

Furthermore, the measuring device, which is configured to detect the change between areas with the first material and areas with the second material or to detect the presence and absence of the second material, can be configured in such a way that it can itself be attached to the bicycle in such a way that it is aligned with the surface of the circumference of the pulse wheel. It can, for example, be attached to a bicycle fork or a strut, such as the seat stay or chain stay, for example via a fastening point or clamp provided there. Therefor, the main body of the measuring device can also be positioned between the brake disc and the frame.

Preferably, the evaluation circuit of the measuring device comprises a rectifier for rectifying the voltage of the oscillating circuit and a capacitor for smoothing the rectified voltage, in order to provide an output voltage that is dependent on the amplitude of the oscillator/oscillating circuit.

In addition, the evaluation circuit of the measuring device may comprise a comparator which is configured to provide a signal at an output of the comparator which represents the amplitude changes of the oscillator/oscillating circuit, depending on a test as to whether the output voltage of the rectifier is greater or less than an average voltage of the rectifier. This can be realized in the form of a high-pass filter.

Finally, the evaluation circuit of the measuring device may comprise a current controller which is configured to control the current consumption of the evaluation circuit depending on the signal at the output of the comparator, wherein the current controller in particular comprises a switch controlled via the comparator output which switches an additional current flow via a load resistor so that the speed can be determined on the basis of the current consumption change of the evaluation circuit.

BRIEF DESCRIPTION OF THE DRAWINGS

The drawings described herein are for illustrative purposes only of a selected embodiment and not all possible implementations and therefore is not intended to limit the scope of the present disclosure.

The invention is explained in more detail below with reference to exemplary embodiments and schematic drawings. These drawings show.

DETAILED DESCRIPTION

Example embodiments will now be described more fully with reference to the accompanying drawings.

Figure 1:
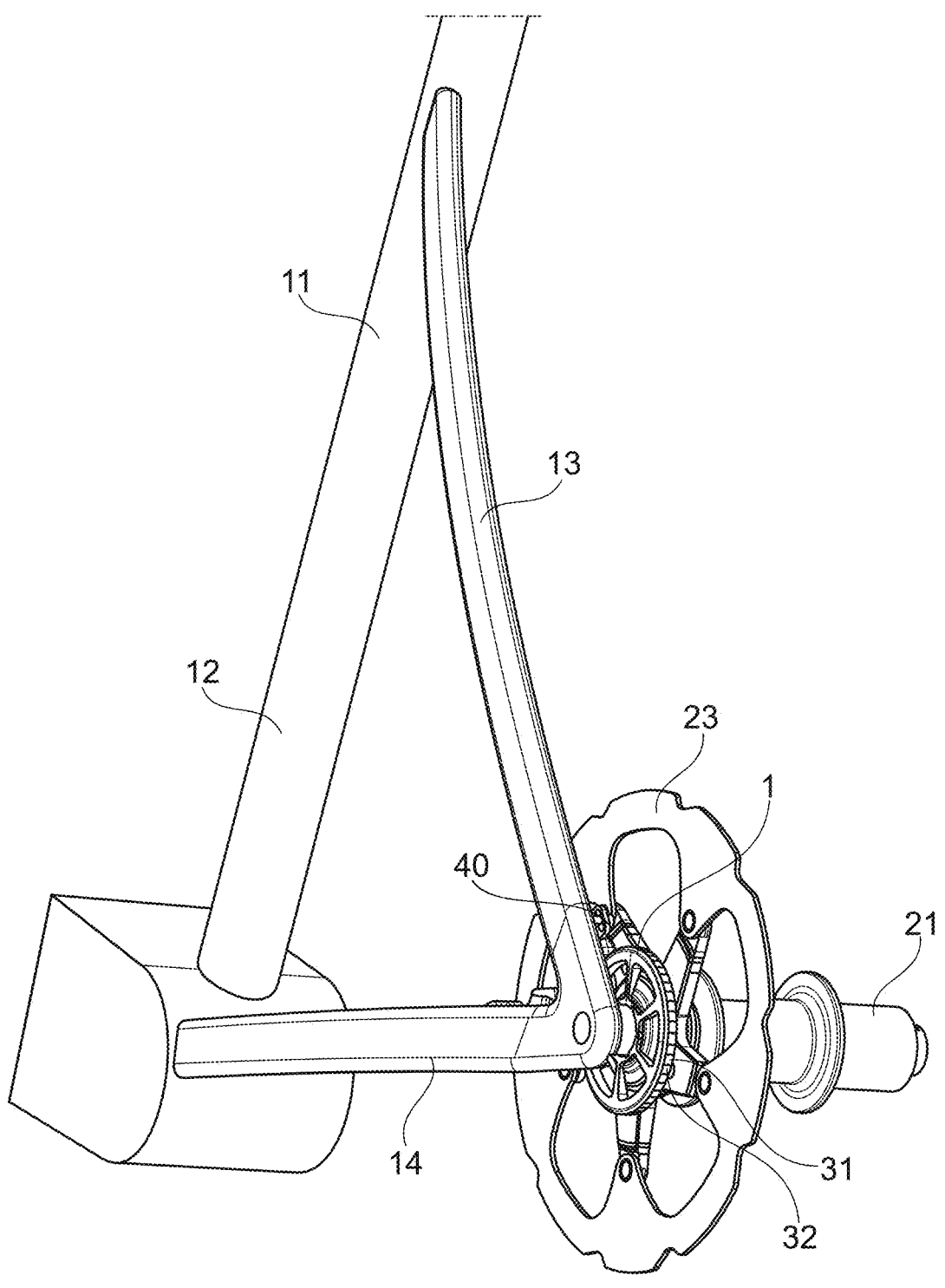
FIG. 1 a highly schematized rear area of a bicycle.

FIG. 1 shows the highly simplified rear area of a bicycle, which is given as an example representative of vehicles which are driven by physical force or by an electric motor, in which the speed of the vehicle is determined on the basis of a revolution or rotation measurement of a wheel of the vehicle with a system comprising a pulse wheel and a measuring device, and which, in addition to bicycles as the most typical group, also include scooters, wheelchairs, roller or the like.

The bicycle frame 11 shown here essentially consists of a seat tube 12 and highly schematized saddle 13 and chain stays 14, wherein the second part of the stays has been omitted for reasons of clarity. The chain stays 14 are also referred to as lower stays.

A wheel with its hub 21 is attached to the bicycle frame 11, wherein other components of the wheel, such as rims, spokes, carcass or tires, are not shown for reasons of clarity. A brake disc 23 is attached to the hub 21.

A pulse wheel 1 according to the invention is provided between the brake disc 23 and the bicycle frame 11. In the embodiment shown here, this is constructed from two different materials. A material can be used as the main material which does not have any influence on a measuring device 40 assigned to the pulse wheel, which is used to detect the revolutions of the pulse wheel 1.

Figure 2:
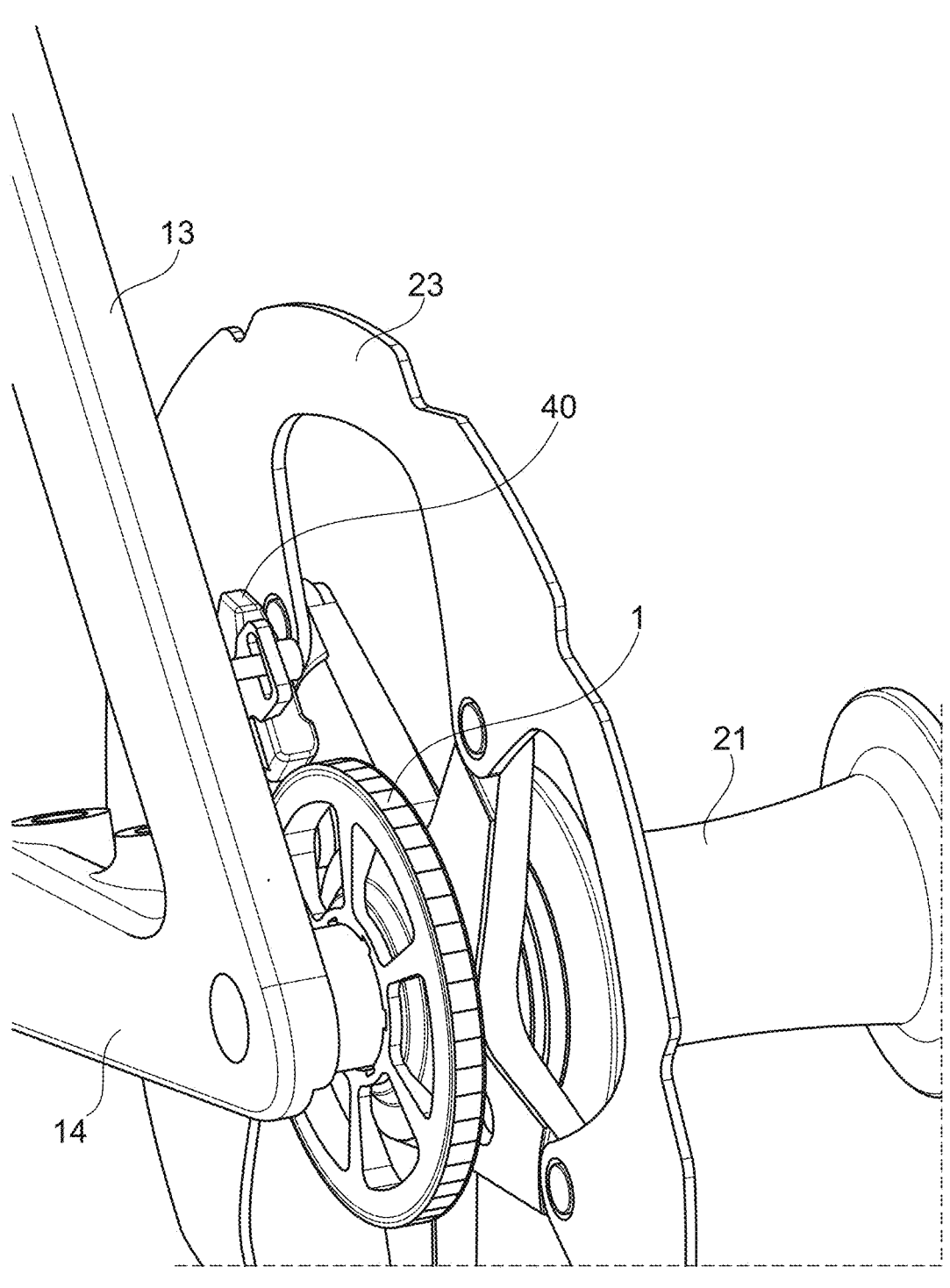
FIG. 2 a magnified view of the central area of FIG. 1 around the hub.
Figure 3:
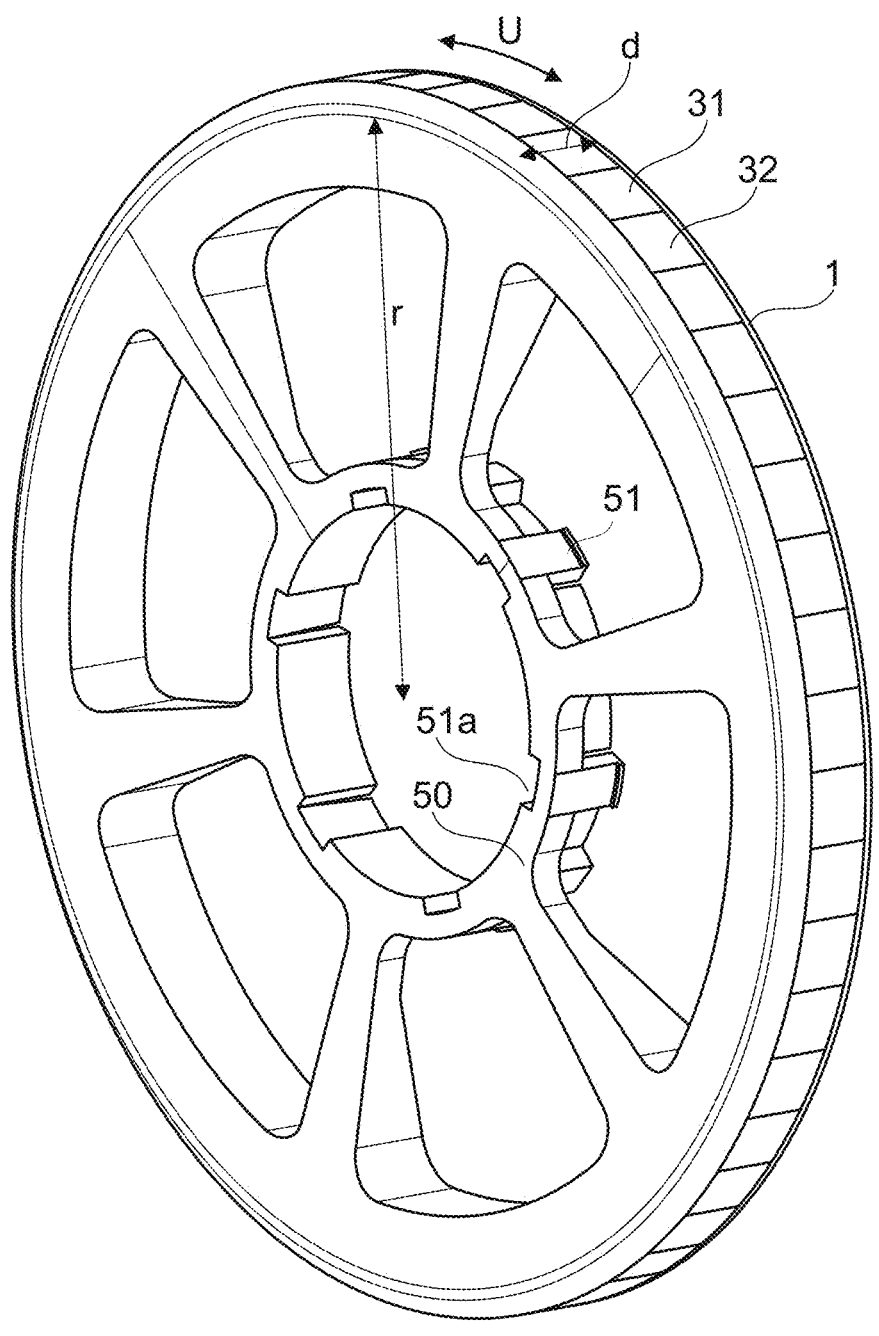
FIGS. 3 to 5 different configurations of a pulse wheel according to the invention.
Figure 4:
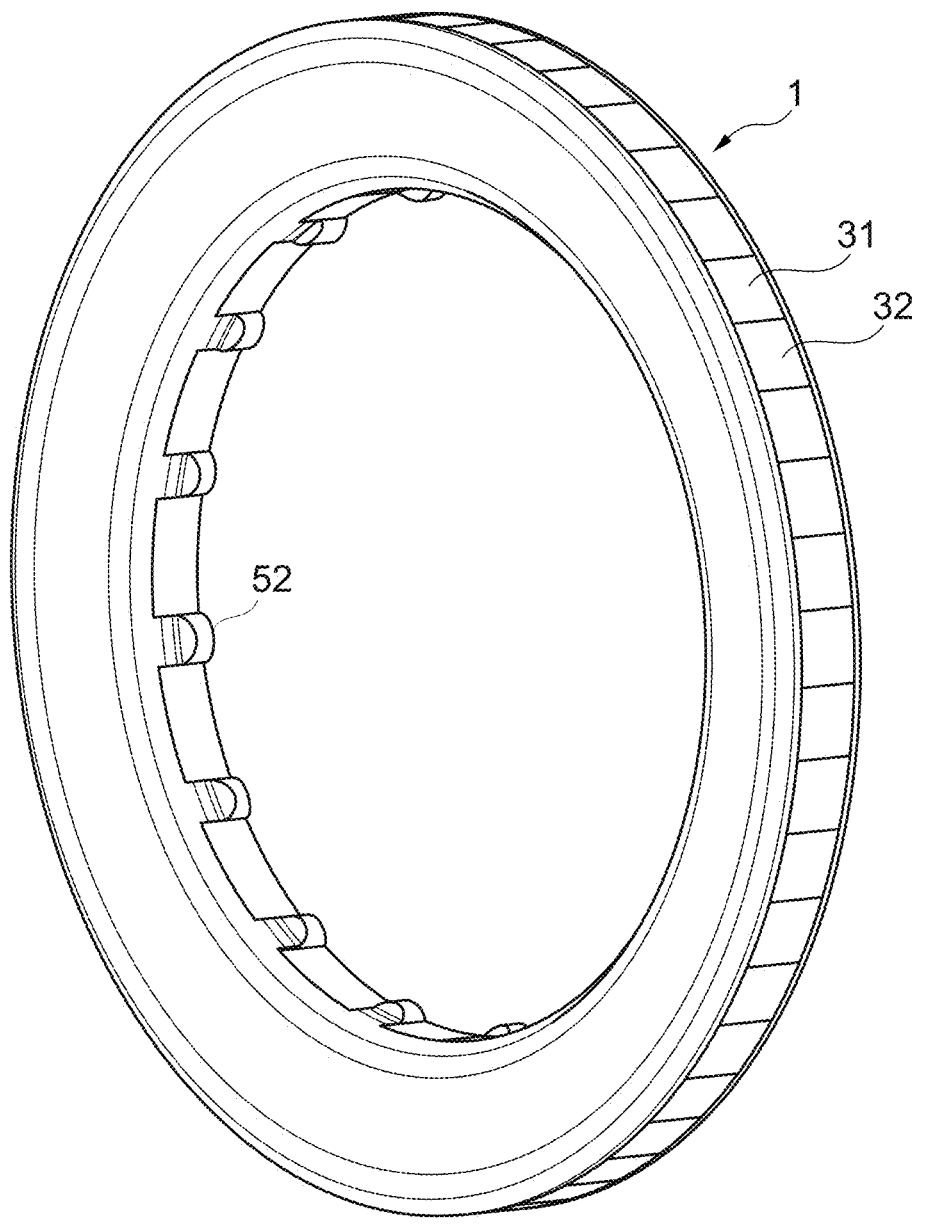
Figure 5:
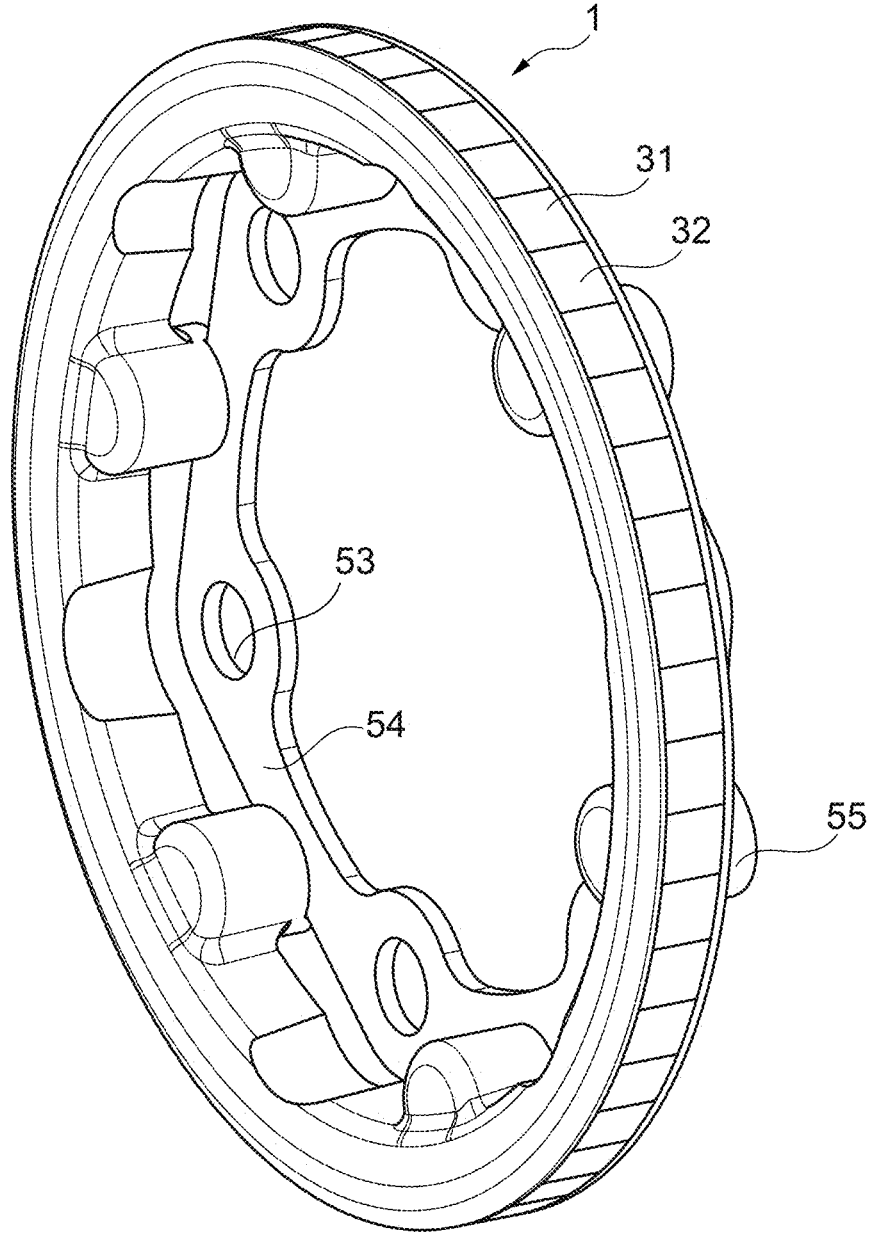

The pulse wheel 1 shown in FIGS. 1 and 2 is shown separately in FIG. 3. Alternative configurations for pulse wheels 1 are shown in FIGS. 4 and 5.

The pulse wheel 1 is shaped like a wheel or disc and has a circumference U with a width d. Two different materials 31, 32 are arranged on the circumferential surface. The material 31 can also be the main material of the pulse wheel 1. The material 32 is preferably selected so that it exerts an influence on the measuring device 40, whereas the material 31 is preferably selected so that it does not exert any influence, or not a significant influence.

In other words, the material 32 is selected so that it is, for example, magnetic, but preferably electrically conductive, for example a metal, an electrically conductive plastic or a ferromagnetic material, so that its presence in a detection or influence area can be detected by the measuring device 40 (which detects, for example, the presence of a magnetic field when a magnetic material is used). If other measuring principles are selected, for example oscillating circuits and their influence, the metallic material is also sufficient for the material 32. However, an optical measuring principle can also be used, in which, for example, differences between light and dark or reflection and non-reflection are evaluated.

Figure 6:
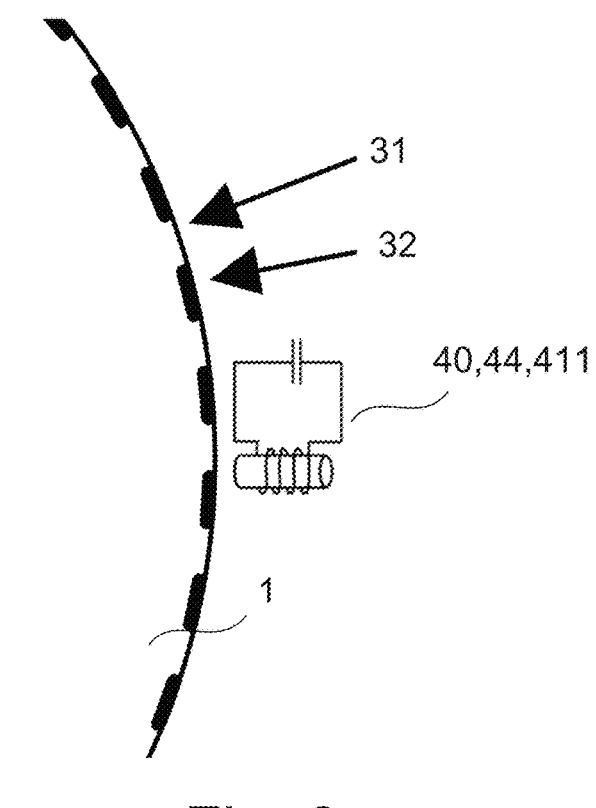
FIG. 6 is a highly schematized representation of the components of the system and their positional assignment in the installed state.

The measuring device 40 is mounted near the pulse wheel 1 so that when the pulse wheel rotates, the first and second material are alternately near the measuring device or its measuring zone (specifically in the magnetic field of the coil of the LC resonant circuit described later) (see also FIG. 6). The distance can here be in the range of 1.5 mm.

The measuring principle of the measuring device 40 of the system according to the invention therefor is based on an oscillator that excites an oscillating circuit 44 which comprises a coil and a capacitor. This generates a high-frequency alternating electromagnetic field that emerges from the active surface of the sensor. When the electrically conductive object moves into this magnetic field, eddy currents are induced in the object. These eddy currents draw energy from the oscillating circuit, which leads to a damping of the oscillation amplitude. This change in the oscillation amplitude is detected and evaluated by electronics in the sensor. With digital sensors, this can be used to generate a switching signal; with analog sensors, an output signal proportional to the object distance can be generated. By measuring the change in vibration amplitude, the speed of a moving object can be detected. The faster the object moves, the greater the change in vibration amplitude and the higher the output signal of the sensor. In principle, it is advantageous for the invention if the two materials 31, 32 are different and thus influence the measuring device 40 differently or generate different signals there. This makes it possible to detect or analyze whether an area with the first material 31 or second material 32 is located opposite the measuring device 40 or is passing it.

As can be seen in FIG. 2 in particular, the measuring device 40 is also attached to the bicycle frame 11, in this case to the seat stay 13. In principle, however, it can also be provided on the chain stay 14 or another location.

The measuring device 40 is configured so that it is positioned opposite the circumferential surface of the pulse wheel 1 in the installed state. In other words, the sensor surface or the sensor area of the measuring device 40 is provided opposite the circumferential surface of the pulse wheel 1.

As can be seen, in particular from FIG. 2, a space-saving positioning can be achieved by such a combination of the pulse wheel 1 according to the invention with the placement of the measuring device 40, which is also relatively well shielded from the environment by the frame and protected against damage.

FIGS. 3, 4 and 5 show different embodiments of a pulse wheel 1 according to the invention for different types of fastening. The embodiment shown in FIG. 3 is suitable for an internal center-lock fastening, while the version shown in FIG. 4 is suitable for an external center-lock fastening. FIG. 5 is intended for attachment to the brake disc 23 with six screws. What is important for the invention here is not the exact shape of the pulse wheel, but the fact that areas with different materials alternate on its circumference area.

More precisely, the pulse wheel comprises a hole in the center of the radially inner area, through which the hub or a part thereof and the axle of the wheel extend in the installed state. The hole forms the center of a fastening ring 50, on which a toothing 51 is formed on a side facing axially towards the hub and on a flange facing radially outwards, which in the example of FIG. 3 corresponds to an internal center-lock fastening or can be fitted into such a fastening. In this way, the pulse wheel can be fitted onto a corresponding locking ring or lock ring of the brake disc, which is mounted on the hub, in order to fix the brake disc, and connected to the hub in a form-fit, non-rotating manner. On the radially inwardly-facing side of the fastening ring 50, a corresponding toothing 51a is formed for an internal center-lock fastening, which passes through in the axial direction from one axial side to the opposite axial side.

In contrast, the example shown in FIG. 4 is suitable for an external center-lock fastening and accordingly has a larger hole and, on its circumference, a radially inwardly directed toothing 52 that matches the external center-lock fastening, which toothing can be placed on the corresponding locking ring or lock ring of the brake disc of this type and can be connected to the hub in a form-fit, rotational fixed manner relative to the hub.

In the variant shown in FIG. 5, the pulse wheel is provided with 6 through-holes 53, which are distributed around the center hole on a radial flange 54 in such a way that they are aligned with a conventional 6-bolt mount for the brake disc on a hub. The radial flange is offset in the axial direction towards the side of the hub and forms a free space for receiving the heads of the fixing bolts and comprises spacers 55 on the side facing the hub, which fix the brake disc on the hub when being in the fitted state.

In a variant not shown, the pulse wheel 1 can also be configured to serve as a locking or lock ring of the brake disc 23 itself and to replace such a locking or lock ring as a separate component. In this case, the pulse wheel is provided in a manner known per se, like the locking or lock ring, with a thread that can be screwed into the corresponding mating thread on the hub, with a projection that fixes the brake disc in the screwed-in state, and with an internal Centerlock fastening or an external Centerlock fastening to which the corresponding tool for screwing in or unscrewing the pulse wheel can be attached.

In principle, however, the fastening of the pulse wheel 1 can also be configured differently. What is essential here is that the pulse wheel 1 is attached to the hub 21 in a rotational fixed manner or indirectly to the hub 21 via the brake disc 23, so that a rotation of the hub 21 and thus of the wheel can be reliably transmitted to the pulse wheel 1. The measuring device 40 comprises an oscillator, which has an LC oscillating circuit 44 with an unshielded coil whose magnetic field penetrates out of the coil body up into the area of the pulse wheel 1 with the alternating arranged areas of first and second material, and a capacitor. The second (electrically conductive) material 32 located near the coil influences the attenuation of the coil. With these changes in the coil environment, the amplitude of the oscillation of the LC oscillating circuit 44 changes.

The evaluation circuit 411 of the measuring device 40 further comprises a series resistor 43 to the LC resonant circuit 44 and a rectifier 42 for rectifying the voltage of the LC resonant circuit 44 and a capacitor 46 for smoothing the rectified voltage to provide an output voltage dependent on the amplitude of the voltage of the resonant circuit. Specifically, the voltage of the LC resonant circuit 44 is decoupled with a capacitor 41 and fed to the rectifier 42.

Figure 7:
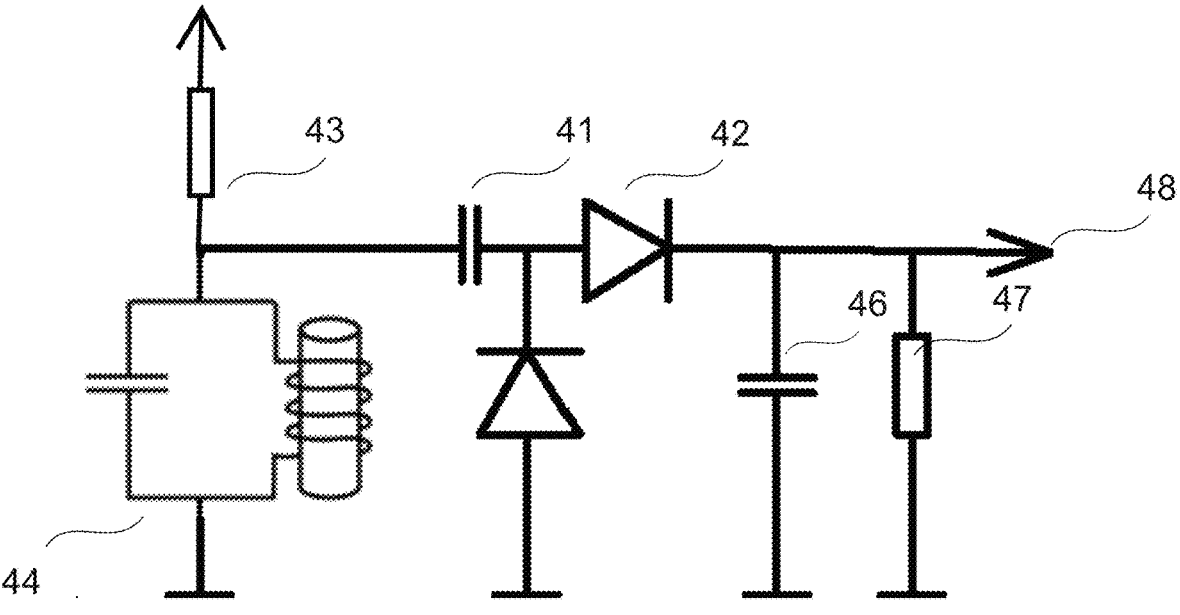
FIG. 7 a schematic circuit diagram of part of the measuring device with oscillator and rectifier.

Specifically, with reference to FIG. 7, the rectified voltage is smoothed with the capacitor 46. The output of the rectifier is loaded with a resistor 47. The current via the capacitor 41 depends on the frequency and amplitude of the LC resonant circuit. After the rectifier, a voltage is available at the output 48 which is dependent on the frequency and amplitude of the LC resonant circuit 44. According to the invention, the amplitude or its change is evaluated.

The evaluation circuit 411 of the measuring device 40 further preferably comprises a comparator 45, which is configured to provide a signal at an output of the comparator 49, which represents the amplitude changes of the oscillator/oscillating circuit 44, depending on a test as to whether the output voltage of the rectifier 42 is greater or less than an average voltage of the rectifier 42 (high-pass).

Figure 8:
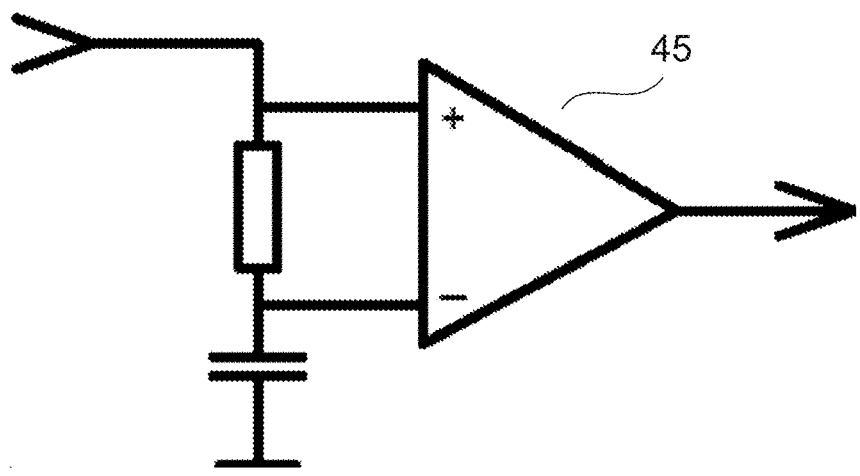
FIG. 8 a schematic circuit diagram of a comparator of the measuring device.

Specifically, with reference to FIG. 8, the comparator 45 is used to check whether the output voltage of the rectifier 42 is greater or less than the average voltage of the rectifier (high pass). In the steady state, the capacitor of the comparator 45 is charged to the average voltage of the rectifier. A signal is available at the output of the comparator, which represents the frequency/amplitude changes of the LC oscillator 44.

The evaluation circuit 411 of the measuring device 40 further preferably comprises a current controller which is configured to control the current consumption of the evaluation circuit 411 depending on the signal at the output of the comparator 49, wherein the current controller in particular comprised a switch 410 which is controlled via the comparator output and switches an additional current flow via a load resistor 413, so that the speed can be determined on the basis of the current consumption change of the evaluation circuit.

Figure 9:
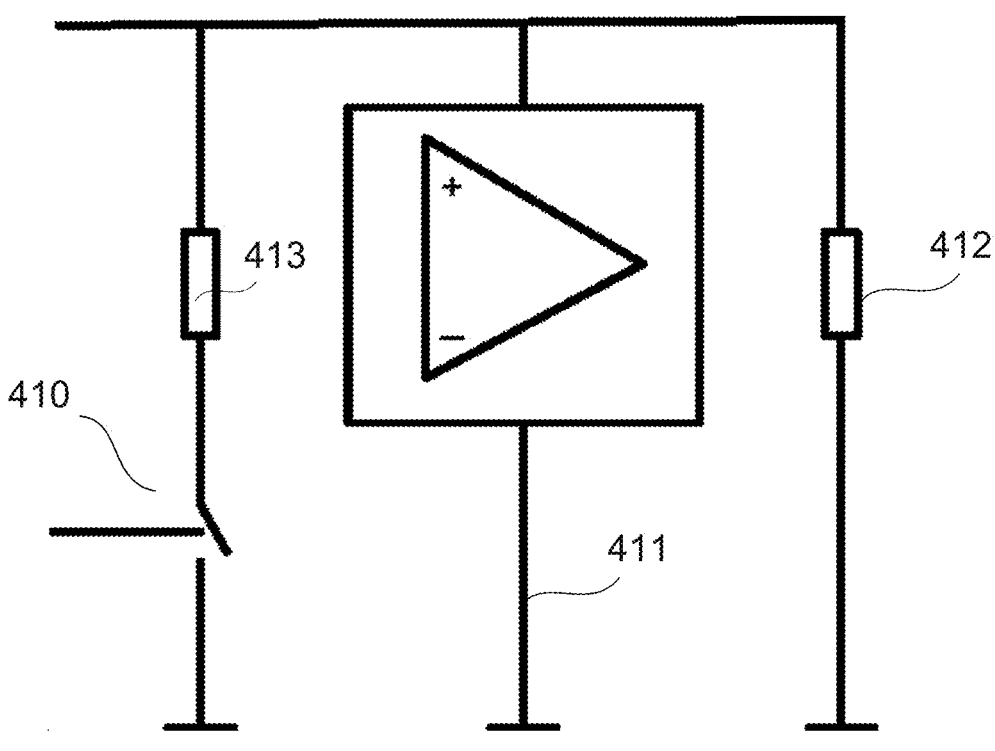
FIG. 9 a schematic circuit diagram of a current controller of the measuring device.

Specifically, with reference to FIG. 9, the power consumption of the circuit is controlled depending on the sensor signal. The minimum current consumption is made up of the current consumption of the electronic circuit 411 and a load resistor 412. The minimum current consumption is set via the dimensioning of the load resistor 412. The comparator output controls via a switch 410 an additional current via a second load resistor 413. The maximum current consumption can be set by dimensioning the second load resistor 413. For the vehicle (e.g., bicycle) on which this system is used, the speed can be deduced from the current consumption changes.

The invention claimed is:

1. A pulse wheel for measuring the revolution of a wheel of a vehicle, comprising:

a wheel axle that can be fixed to a frame of the vehicle and a hub that can rotate thereon, and a brake disc which is firmly connected to the hub, wherein the pulse wheel is configured to be mounted between the brake disc and the frame in a rotationally fixed manner with respect to the hub, in the installed state, wherein the pulse wheel comprises two different materials, wherein a first material of the two different materials is configured not to exert any influence on a measuring device for determining the revolutions, and wherein a second material of the two different materials is configured to exert an influence on the measuring device, and wherein the pulse wheel is shaped like a wheel or a disc, with a width (d), a radius (r) and a circumference (U), wherein areas with the first material and areas with the second material are arranged each alternately to one another on the circumference (U).

2. The pulse wheel according to claim 1, wherein the first material of the pulse wheel is an electrically non-conductive material.

3. The pulse wheel according to claim 1, wherein the second material of the pulse wheel is an electrically conductive material.

4. The pulse wheel according to claim 1, wherein the second material is a magnetic or a ferromagnetic material.

5. The pulse wheel according to claim 1, wherein the areas with the first material and the areas with the second material on the circumference (U) of the pulse wheel have each substantially the same size.

6. The pulse wheel according to claim 1, wherein the areas with the first material and the areas with the second material are distributed equally or regularly or irregularly on the circumference (U) of the pulse wheel.

7. The pulse wheel according to claim 1, wherein at least 20 areas each with the first and the second material are arranged on the circumference (U) of the pulse wheel.

8. The pulse wheel according to claim 1, wherein the pulse wheel, preferably a radially inner region of the pulse wheel, consists mainly of the first material.

9. The pulse wheel according to claim 1, wherein:
a main body of the pulse wheel is produced by an injection molding process, wherein the areas for the second material are provided as recesses on the circumference, and
in that the second material is inserted, in particular glued, into these recesses.

10. The pulse wheel according to claim 1, wherein the pulse wheel has a diameter that is at least twice as large as the diameter of the hub and/or has a diameter that is smaller, in particular half as small, as the diameter of the brake disc.

11. The pulse wheel according to claim 1, wherein the pulse wheel is configured to be attached to the hub in a rotational fixed manner by means of an internal Centerlock fastening or an external Centerlock fastening, by positive engagement with a toothing of the internal Centerlock fastening or the external Centerlock fastening, or a 6-bolt fastening of the brake disc, so that the pulse wheel is attached between the brake disc and the frame in a rotational fixed manner with respect to the hub, in the installed state, or in that the pulse wheel is configured to serve as a locking ring or lock ring of the brake disc and is configured with an internal Centerlock fastening or an external Centerlock fastening.

12. A system for determining the speed of a vehicle on the basis of a revolution measurement of a wheel of the vehicle, wherein the wheel comprises a wheel axle which can be fixed to a frame of the vehicle and a hub which can rotate thereon and preferably a brake disc which is firmly connected to the hub,
wherein the system comprises,
a measuring device;
a pulse wheel comprised of first and second different materials, the first material configured not to exert any influence on the measuring device;
the measuring device being associated with the pulse wheel in the installed state for determining the revolutions of the pulse wheel, and
wherein the second material of the pulse wheel is an electrically conductive material, in order to exert an influence on the measuring device, and
wherein the measuring device comprises an oscillator which excites an oscillating circuit that comprises an inductor and a capacitor, the oscillating circuit amplitude of which is damped by the movement of the second material into the alternating electromagnetic field of the inductor, and an evaluation circuit which is configured to evaluate the change in the oscillating amplitude of the voltage of the oscillating circuit produced thereby and to determine the revolutions of the pulse wheel.

13. The system according to claim 12, wherein the measuring device is configured to be aligned with the surface of the circumference (U) of the pulse wheel in the installed state, in order to detect the change between the areas with the first material and areas with the second material.

14. The system according to claim 12,
wherein the evaluation circuit of the measuring device comprises a rectifier for rectifying the voltage of the oscillating circuit and a capacitor for smoothing the rectified voltage, in order to provide an output voltage which is dependent on the amplitude of the voltage of the oscillating circuit.

15. The system according to claim 14,
wherein the evaluation circuit of the measuring device comprises a comparator which is configured to provide, at an output of the comparator, a signal which represents the amplitude changes of the voltage of the oscillating circuit depending on a test as to whether the output voltage of the rectifier is greater than or less than an average voltage of the rectifier.

16. The system according to claim 15,
wherein the evaluation circuit of the measuring device comprises a current controller which is configured to control the current consumption of the evaluation circuit depending on the signal at the output of the comparator, wherein the current controller comprises, in particular, a switch which is controlled via the comparator output and switches an additional current flow via a load resistor, so that the speed can be determined on the basis of the current consumption change of the evaluation circuit.

* * * * *